April 17, 1951  E. F. CLINE  2,549,172
CABLE GUARD FOR WINCH ASSEMBLIES
Filed May 6, 1949
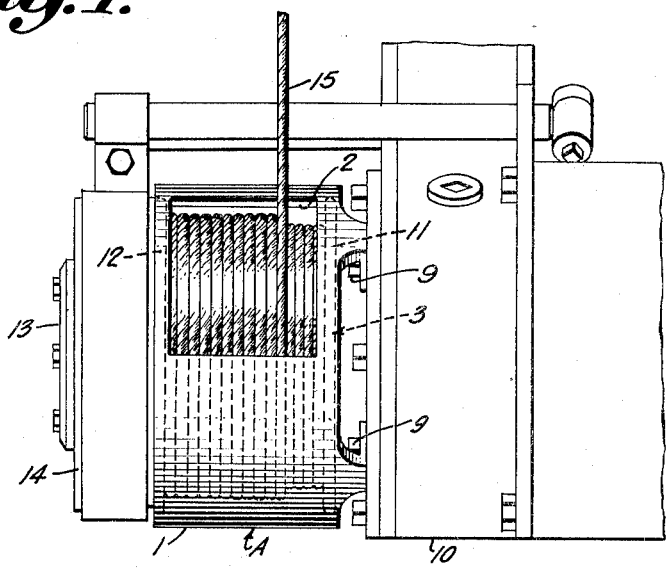
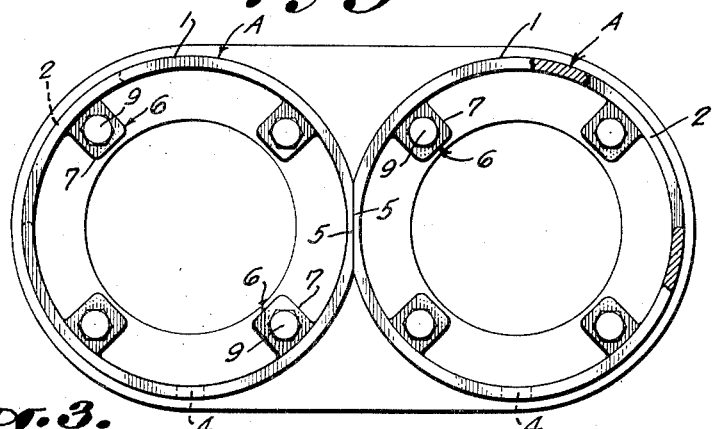
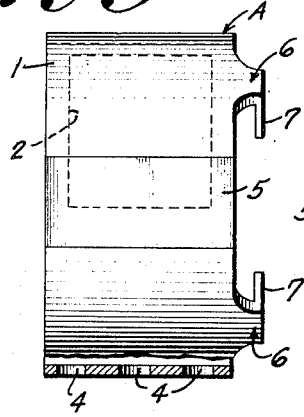
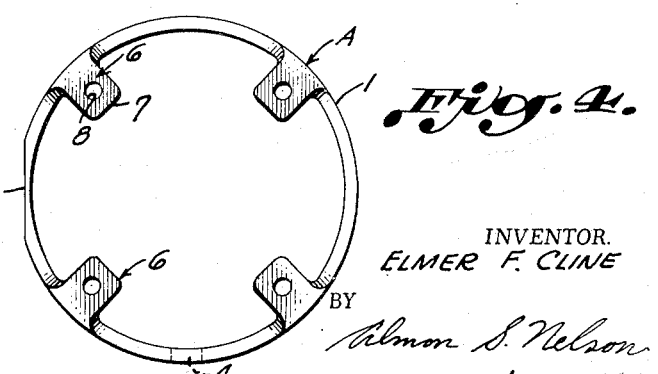
INVENTOR.
ELMER F. CLINE
BY
Almon S. Nelson
ATTORNEY Patented Apr. 17, 1951

2,549,172

UNITED STATES PATENT OFFICE 2,549,172

CABLE GUARD FOR WINCH ASSEMBLIES

Elmer F. Cline, Skippers, Va.

Application May 6, 1949, Serial No. 91,828

9 Claims. (Cl. 254—150)

This invention relates to a cable guard for a winch assembly and more particularly the embodiment illustrated relates to cable guards for a twin winch assembly such as disclosed in Patent No. 2,321,905, issued to H. C. French on June 15, 1943. For the purpose of more fully understanding my invention it is desired to incorporate in the present disclosure the disclosure of the said patent.

While cable guards for winch assemblies have previously been provided, insofar as I am aware none of these has proved satisfactory and it has often been necessary to replace as many as three cables in a single day due to the fact that the cable either becomes broken, as a result of slipping over the flanges of the cable winding drum due to slack occurring in the cable, or must be burned in two to remove it from a position between the forward flange of the cable winding drum and the gear box housing, in which position it becomes lodged after such slack in the cable causes it to slip over said flange.

After hard usage the normally round cable assumes a somewhat flattened condition and in this condition it more readily kinks and becomes lodged between the forward flange of the cable winding drum and the gear box. Slack occurs in the cable if the operator drops the scraper blade too quickly, or as sometimes happens, if an obstruction is hit by the blade which causes a sudden lifting of the scraper, slack will occur in the cable. It is this slack which cannot be avoided that causes the cable to become lodged between the above-mentioned flange and gear box. Considerable time is lost in burning out or replacing the cable. Approximately one hour is required to replace a broken cable and if the cable must be burned out, the time lost is two or three hours or more and in addition, the gear box oil seal is ruined. Then, too, the cables are quite expensive, costing on the present market approximately $60.00 for a 100-foot cable and it can readily be seen that if even one cable has to be replaced it involves a considerable sum of money.

As stated above, the present cable guards of which I am aware do not prevent the cable in every instance from slipping over the flanges of the cable winding drum and thereby frequently lodging between the forward flange of the drum and the gear box, and it is the primary object of this invention to provide a cable guard which does function efficiently and positively prevents the cable from slipping over the said flanges, thereby preventing breaking of the cable or lodging thereof between the forward flange of the drum and the gear box.

A further object of the invention is to provide a cable guard of the above-mentioned type comprising a substantially cylindrical tubular member of relatively heavy construction adapted to surround the cable winding drum in proximity to the flanges thereof whereby the cable cannot slip or move over the edges of the flanges of the cable winding drum when slack occurs therein, said tubular member being provided with an aperture through which the cable may be passed to and from the drum, and suitable means to connect the cylinder to a stationary part of the winch assembly without interference with any of the projecting parts normally provided on such assembly.

Another object of the invention is to provide a cable guard of the above-mentioned type including aperture means in the bottom thereof for the discharge of refuse.

A further object of the invention is to provide a cable guard of the above-mentioned type including means for securing the same to the gear box of the assembly by bolts already provided in such assembly.

A further object of the invention is to provide a twin cable guard assembly wherein the tubular members of the assembly have plane surfaces extending throughout the length of the tubular members for a portion of the periphery thereof whereby the two guards may be assembled with the plane surfaces thereof in juxtaposition, thereby facilitating assembly of the two guards in the winch assembly.

Other and further objects of the invention will become apparent as the description proceeds, reference being made to the accompanying drawing forming a part of the present disclosure, wherein:

Fig. 1 is a fragmentary side elevational view of a winch assembly such as disclosed in the above-mentioned patent provided with my cable guard;

Fig. 2 is a rear elevational view illustrating the relative positions of two cable guards as used in the twin assembly;

Fig. 3 is a side elevational view of one of the cable guards, parts being broken away and shown in section; and Fig. 4 is an end elevational view of one of my cable guards.

Referring in detail to the drawing, it will be seen that my cable guard A comprises a substantially cylindrical tubular member 1 having an aperture 2 at one side adjacent the top thereof through which the cable may be passed to and from the cable winding drum 3, and aperture means 4 in the bottom thereof for the discharge of refuse. The aperture means 4 permit discharge by gravity of any particles of dirt, broken strands of the cable and the like which may enter the tubular member 1.

At the side of the tubular member 1, opposite the opening 2 and approximately 90° from the aperture means 4, said tubular member is provided with a plane surface 5 extending throughout the length thereof for a portion of the periphery of the external surface thereof. As illustrated more clearly in Fig. 2, in a twin assembly, the plane surfaces 5 of the tubular members 1 abut each other in juxtaposed position and facilitate assembly of the cable guards in the winch assembly.

A plurality of circumferentially spaced lugs 6 project axially outwardly from one end of the tubular member 1 and said lugs 6 each include a radially inwardly directed portion 7 having an aperture 8 therein. The aperture 8 is adapted to receive a bolt 9 or the like for securing the cable guard to a stationary part of the winch assembly such as the gear box 10. In the illustrated structure the bolts 9 correspond to the bolts 94 in the above-mentioned patent to French and such bolts 94 or certain of them may also be utilized in the modification illustrated to secure the tubular member 1 to the gear box 10. The spaces between the lugs 6 accommodate certain projecting parts normally provided on the gear box 10.

Referring to Fig. 2, it will be obvious that the only difference between the pair of cable guards therein illustrated is that the lugs 6 are provided on opposite ends of the tubular members 1 to reverse the relative positions of the plane surfaces 5 and the openings 2. Hence similar reference characters have been used to designate the elements of both of the tubular members.

Referring to Fig. 1, in which a portion of the structure illustrated in the above-mentioned patent is also illustrated somewhat diagrammatically, it will be seen that each of the tubular members 1 surrounds a cable winding drum 3 and has a length and diameter such that the tubular members 1 are in proximity to the radially directed annular flanges 11 and 12 of the cable winding drums 3. By this construction it is impossible for the cable to slip or move over the annular flanges 11 and 12 and hence the many difficulties referred to above in connection with such movement of the cable when slack occurs therein are entirely eliminated by my cable guard construction.

The tubular member 1 is preferably constructed of relatively thick steel and, if desired, the cable guard A may be cast as a unitary structure as illustrated. Alternatively, the lugs 6 may be welded or otherwise suitably secured to a length of steel tubing, such steel tubing being provided with the aperture means 4, the opening 2, and the plane surface 5. The minimum thickness of the tubular member 1 at the plane surface 5 is approximately one-sixteenth of an inch thick in one particular construction where the maximum thickness of the tubular member is three-eighths of an inch.

The above-mentioned patent explains in detail the ease with which the winch assembly may be disassembled to remove the plate 13 (63' of the patent), the brake means 14 (50 of the patent) and the cable winding drum 3 (48 of the patent). After removal of these elements my cable guard construction can be readily assembled by merely removing four of the bolts 9 (94 of the patent) positioning the cable guard A in place and reassembling the other elements. After one of the cable guards A is secured to the twin winch assembly, the second may be assembled in a similar manner and in assembling the second, the abutting plane surfaces 5 facilitate positioning and assembly of said second cable guard.

As stated above, the tubular member 1 surrounds the cable winding drum in proximity to the annular flanges thereof and it will, of course, be obvious that the space between the tubular member and such flange should be as small as possible and still provide for relative rotational movement between the drum and tubular member, and is, of course, less than the thickness or diameter of the cable 15, even after it has become somewhat flattened due to hard usage.

While I have illustrated and described in detail herein a twin cable guard assembly, it will be obvious that my improved cable guard A can be used in connection with a single cable winding drum if desired.

Obvious modifications of the preferred form of my invention illustrated and described in detail herein may readily occur to those skilled in the art and it is my desire to cover all such modifications as come within the scope of the appended claims.

I claim:

1. In a twin winch assembly comprising a gear box, and a pair of cable winding drums having radially directed annular flanges at each of the ends thereof; a pair of cable guards for said drums, each of said cable guards comprising a substantially cylindrical tubular member surrounding one of said drums in proximity to the annular flanges thereof whereby to prevent the cable from slipping or moving over the edges of said flanges, a plurality of circumferentially spaced lugs projecting axially outwardly from one end of each of said tubular members, said lugs each including a radially inwardly directed portion having an aperture therein, bolts extending through said aperture to secure said tubular members to said gear box, a portion of the periphery of each said tubular member having a plane surface extending throughout the length of said tubular member, said plane surfaces of the tubular members abutting each other and facilitating assembly of said cable guards in said winch assembly, aperture means in the bottom of each of said tubular members for the discharge of refuse, and an opening adjacent the top of each said tubular member through which cable may be passed to the cable winding drum therein.

2. In a twin winch assembly comprising a gear box, and a pair of cable winding drums having radially directed annular flanges at each of the ends thereof; a pair of cable guards for said drums, each of said cable guards comprising a substantially cylindrical tubular member surrounding one of said drums in proximity to the annular flanges thereof whereby to prevent the cable from slipping or moving over the edges of said flanges, a plurality of circumferentially spaced lugs projecting axially outwardly from one end of each of said tubular members, said lugs each including a radially inwardly directed portion having an aperture therein, bolts extending through said apertures to secure said tubular members to said gear box, a portion of the periphery of each said tubular member having a plane surface extending throughout the length of said tubular member, said plane surfaces of the tubular members abutting each other and facilitating assembly of said cable guards in said winch assembly, and an opening adjacent the top of each said tubular member through which cable may be passed to the cable winding drum therein.

3. In a twin winch assembly comprising a gear box, and a pair of cable winding drums having radially directed annular flanges at each of the ends thereof; a pair of cable guards for said drums, each of said cable guards comprising a substantially cylindrical tubular member surrounding one of said drums in proximity to the annular flanges thereof whereby to prevent the cable from slipping or moving over the edges of said flanges, a plurality of circumferentially spaced lugs projecting axially outwardly from one end of each of said tubular members, means securing said lugs to said gear box, a portion of the periphery of each said tubular member having a plane surface extending throughout the length of said tubular member, said plane surfaces of the tubular members abutting each other and facilitating assembly of said cable guards in said winch assembly, aperture means in the bottom of each of said tubular members for the discharge of refuse, and an opening adjacent the top of each said tubular member through which cable may be passed to the cable winding drum therein.

4. In a twin winch assembly comprising a gear box, and a pair of cable winding drums having radially directed annular flanges at each of the ends thereof; a pair of cable guards for said drums, each of said cable guards comprising a substantially cylindrical tubular member surrounding one of said drums in proximity to the annular flanges thereof whereby to prevent the cable from slipping or moving over the edges of said flanges, a plurality of circumferentially spaced lugs projecting axially outwardly from one end of each of said tubular members, means securing said lugs to said gear box, a portion of the periphery of each said tubular member having a plane surface extending throughout the length of said tubular member, said plane surfaces of the tubular members abutting each other and facilitating assembly of said cable guards in said winch assembly, and an opening adjacent the top of each said tubular member through which cable may be passed to the cable winding drum therein.

5. In a twin winch assembly comprising a gear box, and a pair of cable winding drums having radially directed annular flanges at each of the ends thereof; a pair of cable guards for said drums, each of said cable guards comprising a substantially cylindrical tubular member, means supporting each of said tubular members surrounding one of said drums in proximity to the annular flanges thereof whereby to prevent the cable from slipping or moving over the edges of said flanges, a portion of the periphery of each said tubular member having a plane surface extending throughout the length of said tubular member, said plane surfaces of the tubular members abutting each other and facilitating assembly of said cable guards in said winch assembly, aperture means in the bottom of each of said tubular members for the discharge of refuse, and an opening adjacent the top of each said tubular member through which cable may be passed to the cable winding drum therein.

6. In a twin winch assembly comprising a gear box, and a pair of cable winding drums having radially directed annular flanges at each of the ends thereof; a pair of cable guards for said drums, each of said cable guards comprising a substantially cylindrical tubular member, means supporting each of said tubular members surrounding one of said drums in proximity to the annular flanges thereof whereby to prevent the cable from slipping or moving over the edges of said flanges, a portion of the periphery of each said tubular member having a plane surface extending throughout the length of said tubular member, said plane surfaces of the tubular members abutting each other and facilitating assembly of said cable guards in said winch assembly, and an opening adjacent the top of each said tubular member through which cable may be passed to the cable winding drum therein.

7. A cable guard for use in a twin winch assembly comprising a pair of cable winding drums having radially directed annular flanges at each of the ends thereof; said cable guard comprising a substantially cylindrical tubular member adapted to surround one of said drums in proximity to the annular flanges thereof whereby to prevent the cable from slipping or moving over the edges of said flanges, a plurality of circumferentially spaced lugs projecting axially outwardly from one end of said tubular member, said lugs each including a radially inwardly directed portion having an aperture therein, a portion of the periphery of the external surface of said tubular member having a plane surface extending throughout the length of said tubular member, aperture means in said tubular member for the discharge of refuse, and an opening in said tubular member through which cable may be passed to a cable winding drum.

8. A cable guard for use in a twin winch assembly comprising a pair of cable winding drums having radially directed annular flanges at each of the ends thereof; said cable guard comprising a substantially cylindrical tubular member adapted to surround one of said drums in proximity to the annular flanges thereof whereby to prevent the cable from slipping or moving over the edges of said flanges, a plurality of circumferentially spaced lugs projecting axially outwardly from one end of said tubular member, said lugs each including a radially inwardly directed portion having an aperture therein, a portion of the periphery of the external surface of said tubular member having a plane surface extending throughout the length of said tubular member, and an opening in said tubular member through which cable may be passed to a cable winding drum.

9. A cable guard for use in a twin winch assembly comprising a pair of cable winding drums having radially directed annular flanges at each of the ends thereof; said cable guard comprising a substantially cylindrical tubular member adapted to surround one of said drums in proximity to the annular flanges thereof whereby to prevent the cable from slipping or moving over the edges of said flanges, a plurality of circumferentially spaced lugs projecting from one end of said tubular member, said lugs each including a portion having an aperture therein, a portion of the periphery of the external surface of said tubular member having a plane surface extending throughout the length of said tubular member, and an opening in said tubular member through which cable may be passed to a cable winding drum.

ELMER F. CLINE.

REFERENCES CITED

The following references are of record in the file of this patent:

UNITED STATES PATENTS

| Number | Name | Date |
| --- | --- | --- |
| 1,281,007 | Hooker | Oct. 8, 1918 |
| 2,092,774 | Osgood | Sept. 14, 1937 |
| 2,402,289 | Lear et al. | June 18, 1946 |